United States Patent
Moore

(10) Patent No.: US 7,043,976 B1
(45) Date of Patent: May 16, 2006

(54) NORTH WILDWOOD FLYIN' SOCKS

(76) Inventor: Curtis Lee Moore, 225 W. 3rd Ave., North Wildwood, NJ (US) 08260

( * ) Notice: Subject to any disclaimer, the term of this patent is extended or adjusted under 35 U.S.C. 154(b) by 0 days.

(21) Appl. No.: 11/007,107

(22) Filed: Dec. 7, 2004

(51) Int. Cl.
*A63B 53/00* (2006.01)
(52) U.S. Cl. ................................... 73/170.01
(58) Field of Classification Search ............ 73/170.01, 73/170.07, 170.06; 43/3; 473/407
See application file for complete search history.

(56) References Cited

U.S. PATENT DOCUMENTS

| | | | |
|---|---|---|---|
| D271,183 S | | 11/1983 | Conrad et al. |
| 4,509,751 A | * | 4/1985 | Tabet ........................ 473/407 |
| D315,105 S | | 3/1991 | Sutton |
| 5,117,690 A | * | 6/1992 | Baer ....................... 73/170.07 |
| 5,172,506 A | * | 12/1992 | Tiley et al. ...................... 43/3 |
| 5,319,967 A | * | 6/1994 | Rickards, Jr. ............ 73/170.06 |
| 5,323,649 A | * | 6/1994 | Carlson ................... 73/170.07 |
| 5,572,945 A | * | 11/1996 | Eastaugh ..................... 116/173 |
| 5,727,980 A | | 3/1998 | Stipa |
| 6,032,523 A | * | 3/2000 | Smith ...................... 73/170.07 |
| 2002/0178996 A1 | * | 12/2002 | Damberger ................ 116/173 |

\* cited by examiner

*Primary Examiner*—Jewel V. Thompson

(57) ABSTRACT

A wind direction and speed indicator includes a sock member having an open end, a main portion, a toe portion, and a heel portion. A plurality of strings extend from the open end for coupling the sock member to a support structure. The open end forms a rigid loop for permitting air to enter into the sock member. The main portion of the sock member is constructed of material resistant to permeation by wind. The toe portion of the sock member is constructed of a mesh material for permitting air to pass through the toe portion such that wind entering into the sock member urges the sock member to inflate responsive wind speed.

6 Claims, 2 Drawing Sheets

NORTH WILDWOOD FLYIN' SOCKS

I. BACKGROUND OF THE INVENTION

The present invention relates to wind devices and more particularly pertains to a new wind direction and speed indicator for providing a decorative indicator of wind speed and wind direction.

II. DESCRIPTION OF THE PRIOR ART

The use of wind devices is known in the prior art. U.S. Pat. No. 5,727,980 issued to Stipa on Mar. 17, 1998 describes a decorative device that rotates about an axis dependent on wind speed and direction. Another type of wind device is U.S. Design Pat. No. 271,183 issued to Conrad et al. disclosing a decorative design for a wind sock. U.S. Design Pat. No. 315,105 issued to Sutton on Mar. 5, 1991 discloses another ornamental design for a wind sock.

While these devices fulfill their respective, particular objectives and requirements, the need remains for a wind sock device having unique decorative and functional structure.

III. SUMMARY OF THE INVENTION

The present invention generally comprises a sock member having an open end, a main portion, a toe portion, and a heel portion. A plurality of strings extend from the open end for coupling the sock member to a support structure. The open end forms a rigid loop for permitting air to enter into the sock member. The main portion of the sock member is constructed of material resistant to permeation by wind. The toe and heel portion of the sock member is constructed of a mesh material for permitting air to pass through the toe and heel portion such that wind entering into the sock member urges the sock member to inflate responsive wind speed.

There has thus been outlined, rather broadly, the more important features of a wind direction and speed indicator in order that the detailed description thereof that follows may be better understood, and in order that the present contribution to the art may be better appreciated. There are additional features of the wind direction and speed indicator that will be described hereinafter and which will form the subject matter of the claims appended hereto.

In this respect, before explaining at least one embodiment of the wind direction and speed indicator in detail, it is to be understood that the wind direction and speed indicator is not limited in its application to the details of construction and to the arrangements of the components set forth in the following description or illustrated in the drawings. The wind direction and speed indicator is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present wind direction and speed indicator. It is important, therefore, that the claims be regarded as including such equivalent constructions insofar as they do not depart from the spirit and scope of the present invention.

It is another object of the present invention to provide a wind direction and speed indicator which has all of the advantages of the prior art and none of the disadvantages.

It is another object of the present invention to provide a wind direction and speed indicator which may be easily and efficiently manufactured and marketed.

It is another object of the present invention to provide a wind direction and speed indicator which is of durable and reliable construction.

It is yet another object of the present invention to provide a wind direction and speed indicator which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
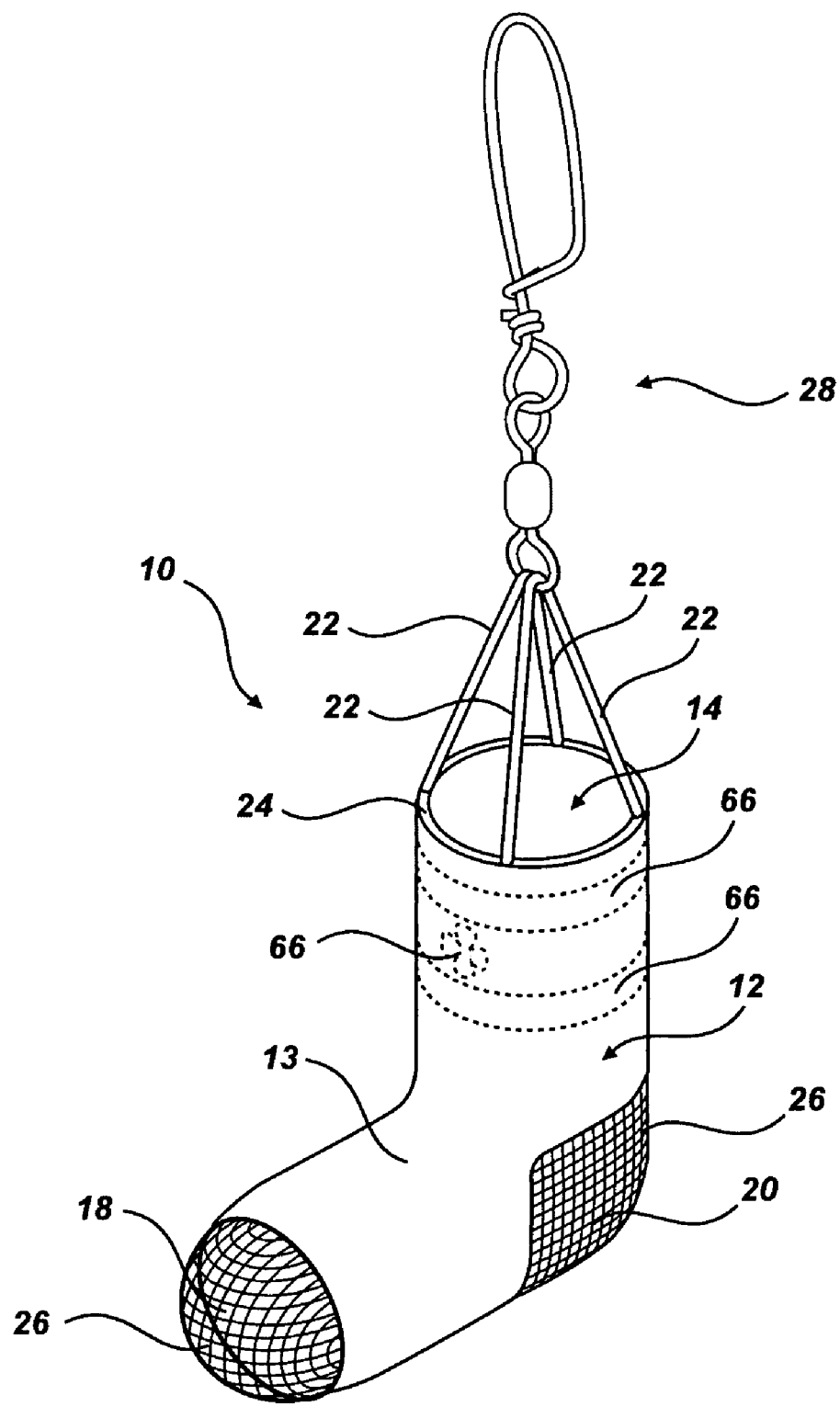
FIG. 1 is a perspective view of a new wind direction and speed indicator according to the present invention.
Figure 2:
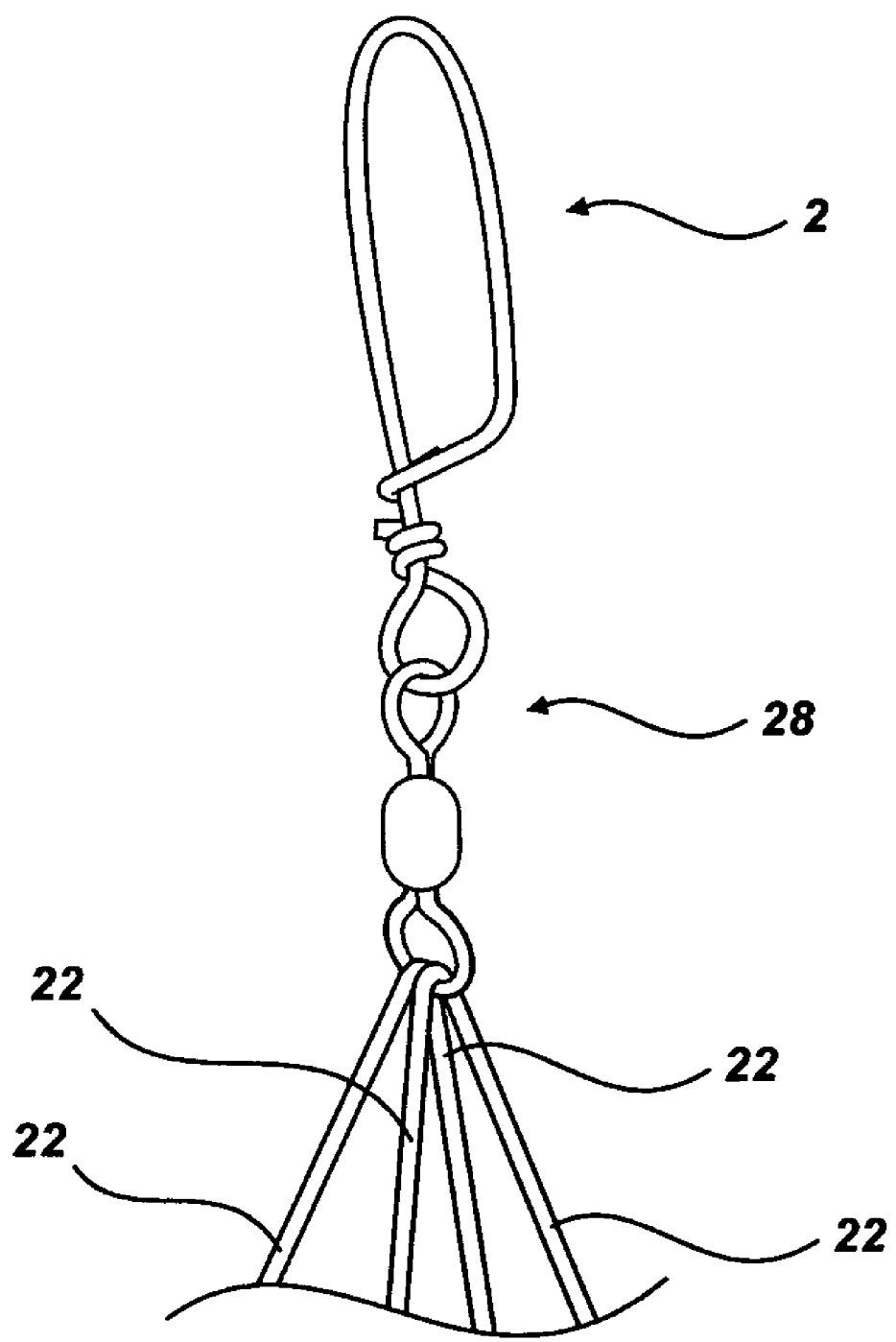
FIG. 2 is a side view of the snap swivel of the present invention.

With reference now to the drawings, and in particular to FIGS. 1 and 2 thereof, a new wind direction and speed indicator embodying the principles and concepts of the present invention and generally designated by the reference numeral 10 will be described.

As best illustrated in FIGS. 1 and 2, the wind direction and speed indicator 10 generally comprises a sock member 12 having an open end 14, a main portion 16, a toe portion 18, and a heel portion 20. Four strings 22 are evenly spaced around the open end 14 of the sock member 12. The strings 22 extend from the open end 14 for coupling the sock member 12 to a support structure 2. The open end 14 forms a rigid loop 24 for permitting air to enter into the sock member 12. The main portion 16 of the sock member 12 is constructed of material resistant to permeation by wind such as nylon or another relatively tightly knit fabric or material. The toe portion 18 of the sock member 12 is constructed of a mesh material 26 for permitting air to pass through the toe portion 18 such that wind entering into the sock member 12 urges the sock member 12 to inflate responsive wind speed. A snap swivel 28 is coupled between the strings 22 and the support structure 2 such that the sock member 12 is free to move radially around the support structure 2 to indicate wind direction. The heel portion 20 of the sock member 12 is constructed of mesh material 26. Decorative indicia 66 may be positioned on an outer surface 13 of the sock member 12.

In use, the strings are attached to the snap swivel which is in turn attached to a support structure. Wind enters into the open end and passes out of the mesh material. The resistance created by the mesh material causes the sock member to inflate partially or fully depending on the wind speed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wind direction and speed indicator comprising:
   (a) a sock member having an open end, a main portion, a toe portion, and a heel portion,
   (b) a plurality of strings extending from the open end for coupling the sock member to a support structure,
   (c) wherein the open end forms a rigid loop for permitting air to enter into the sock member, the main portion of the sock member being constructed of material resistant to permeation by wind,
   (d) further wherein the toe and heel portion of the sock member is constructed of a mesh material for permitting air to pass through the toe and heel portion such that wind entering into the sock member urges the sock member to inflate responsive wind speed.

2. The wind direction and speed indicator of claim further comprising a snap swivel coupled between the strings and the support structure such that the sock member is free to move radially around the support structure to indicate wind direction.

3. The wind direction and speed indicator of claim 1 wherein the heel portion of the sock member is constructed of mesh material.

4. The wind direction and speed indicator of claim 1 further comprising decorative indicia positioned on an outer surface of the sock member.

5. The wind direction and speed indicator of claim 1 wherein the plurality of strings comprises four strings evenly spaced around the open end of the sock member.

6. A wind direction and speed indicator comprising:
   (a) a sock member having an open end, a main portion, a toe portion, and a heel portion, wherein the heel portion of the sock member is constructed of mesh material, further wherein the open end forms a rigid loop for permitting air to enter into the sock member, further wherein the main portion of the sock member being constructed of material resistant to permeation by wind, further wherein the toe portion of the sock member is constructed of a mesh material for permitting air to pass through the toe portion such that wind entering into the sock member urges the sock member to inflate responsive wind speed,
   (b) four strings evenly spaced around the open end of the sock member, the strings extending from the open end for coupling the sock member to a support structure,
   (c) a snap swivel coupled between the strings and the support structure such that the sock member is free to move radially around the support structure to indicate wind direction, and
   (d) decorative indicia positioned on an outer surface of the sock member.

* * * * *